Aug. 21, 1923.
A. C. BUBB
COUPLING DEVICE
Filed March 14, 1923
1,465,804
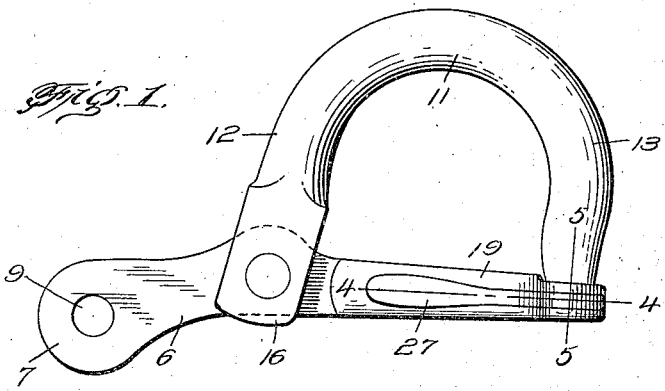
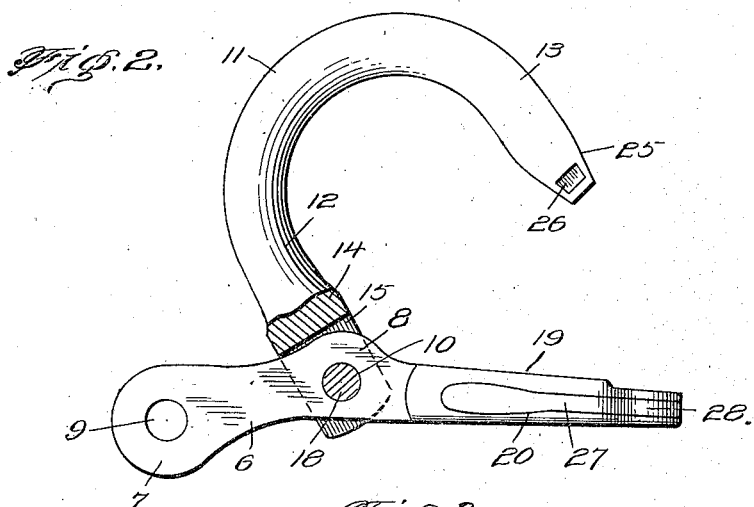
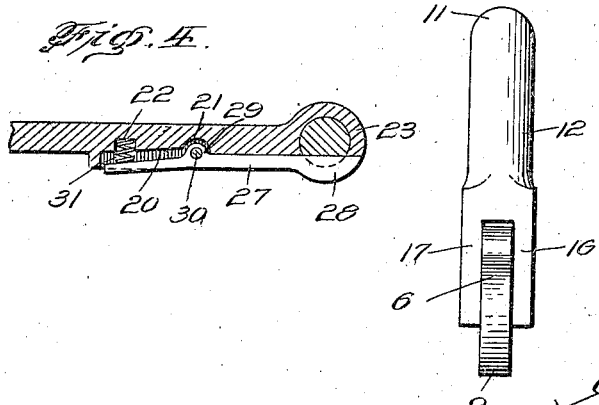
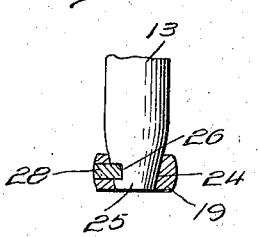
INVENTOR.
Albert C. Bubb
BY
Geo. P. Kimmel
ATTORNEY.

Patented Aug. 21, 1923.

1,465,804

UNITED STATES PATENT OFFICE.

ALBERT C. BUBB, OF BALTIMORE, MARYLAND.

COUPLING DEVICE.

Application filed March 14, 1923. Serial No. 625,022.

*To all whom it may concern:*

Be it known that I, ALBERT C. BUBB, a citizen of the United States, residing in the city of Baltimore and State of Maryland, have invented certain new and useful Improvements in Coupling Devices, of which the following is a specification.

This invention relates to a coupling device, designed primarily for use for securely connecting a towing element with a cross beam of a motor vehicle when the latter is to be towed, but it is to be understood that a coupling device in accordance with this invention can be employed for any purposes wherein it is found applicable, and the invention has for its object to provide, in a manner as hereinafter referred to, a coupling device including a hook-shaped attaching member for engagement with the object to be towed or connected, and releaseable means cooperating with said member for detachably securing it with the object, whereby the coupling device will be maintained securely in coupling position until the attaching member is released.

Further objects of the invention are to provide, in a manner as hereinafter set forth, a coupling device which is simple in its construction and arrangement, strong durable, compact, thoroughly efficient in its use, conveniently applied, readily assembled, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a coupling device, in accordance with this invention, and further illustrating the attaching member in locked position.

Figure 2 is a side elevation, partly in section, of the coupling device and further illustrating the attaching member in released position.

Figure 3 is a rear elevation of the coupling device.

Figure 4 is a section on line 4—4, Figure 1.

Figure 5 is a section on line 5—5, Figure 1.

The coupling device in accordance with this invention comprises a shank, a hook-shaped attaching member pivotally connected with the shank, a guard integral with and projecting from one terminus of the shank and provided with means for receiving one end of the hook-shaped attaching member, and a locking device carried by the guard and cooperating with the attaching member for detachably securing it in closed position.

The shank is indicated at 6, and it is formed from a flat strip of suitable metallic material of the desired length and one end thereof is enlarged as at 7, and the other end is enlarged as at 8. The enlarged end 7 is provided with an opening 9 for attaching a towing element therewith, and the enlarged end 8 is provided with an opening 10 for a purpose to be presently referred.

The attaching member is in the form of a hook, and preferably semi-oval in contour, and is indicated at 11. The member 11 should be of a contour and size as to embrace the cross beam of a motor vehicle and with the legs 12, 13 thereof of a length to depend below the beam so that the shank 6, as well as the guard, to be presently referred to, will be arranged below the beam and which will enable the leg 13 to engage in the guard, in a manner as hereinafter referred to.

The leg 12 is of greater length than the leg 13, and the free end of the leg 12 is enlarged as at 14, and bifurcated, as at 15, for the purpose of straddling the enlarged end 8, of the shank 6. The furcations formed by the bifurcated portion 15, are indicated at 16, 17, and which are positioned at each side of the enlarged end 8 of the shank 6. The furcations 16, 17, are connected to the enlarged end 8 of the shank 6 by a pin 18, which extends through the opening 10, and the connection is such that the member 11 can be shifted to and from open position on the end 8 of the shank 6, when occasion so requires.

Formed integral with the end 8 of the shank 6, is a guard 19 which is disposed in a plane similar to the plane of the end 8 of the shank 6, and one side of the guard 19 is formed with a lengthwise extending groove 20, which communicates with a pocket 21, and a socket 22. The groove 20 extends from a point removed from the inner terminus of the guard 19 and terminates at the outer terminus of said guard 19. The outer end of the guard 19, is formed of a circular enlargement 23, provided with a vertically extending opening 24 having the wall thereof tapered. The opening 24 intersects the outer end portion of the groove 20.

The lower end of the leg 13, of the member 11, is bevelled as at 25, and is formed with a short peripheral groove 26. The bevelled end 25, of the leg 13, is adapted to seat in the opening 24, and with the groove 26 thereof registering with the groove 20, for a purpose to be presently referred to.

The locking device comprises a lever 27, having a segment shaped forward end 28 for engagement in the groove 26 to detachably secure the attaching member in closed position. The lever 27, at a point between its center and its rear end, is offset, as at 29, and extended into the pocket 21. The offset portion 29 of the lever 27 is pivotally connected, as at 30, to the guard 19. Mounted in the socket 22 and engaging the inner side of the rear end of the lever 27, is a coiled spring 31, the function of which is to normally maintain that portion of the lever 27 which projects forwardly from the pivot 30 in the groove 20, so that the end 28 of the lever 27 will be positioned in the outer end of the groove 20, and further when the end 25 of the attaching member is mounted in the opening 24, the end 28 of the lever 27 will be held in the groove 26 of the attaching member 11 to detachably secure said member in closed position.

When the coupling member is set up in operative position, the guard 19 is positioned against the bottom of the beam, and the guard 19 is of such length as to project beyond one side of the beam, so that when the attaching member 11 is moved to securing position, the end 25 of the leg 13 can be extended into the opening 24, so that the said end 25 can be engaged by the lever 27 to detachably secure the attaching member in closed position. The spring 31 tends to maintain the lever 27 in position to maintain the attaching member closed. The attaching member 11, is released from the lever 27, when the rear end of the lever is pressed inwardly against the action of the spring 31, and such movement as applied to the lever 27 will shift the end 28 of the said lever 27 out of the groove, whereby the attaching member can be swung to the position shown in Figure 2.

Although the preferred embodiment of the invention is as described and illustrated, yet it is to be understood that changes in the details of construction can be had without departing from the spirit of the invention as claimed.

What I claim is:—

1. A coupling device comprising a shank having one end thereof provided with an opening, a guard integral with the other end of the shank and provided with an opening and further provided in one side with a lengthwise groove intersecting said opening, a hook-shaped attaching member having one leg pivotally connected with that end of the shank from which the guard extends and further adapted to have its other end extended into the opening in the guard, the last mentioned end of said attaching member having a peripheral groove adapted to register with the groove in the guard, and a pivoted spring controlled locking device mounted in the groove of the guard and engaging in the groove of the attaching member for detachably securing it in closed position.

2. A coupling device comprising a shank having a guard extending therefrom, a hook-shaped attaching member pivotally connected with said shank in proximity to one end of and further adapted to extend into the other end of said guard, and means carried by the guard and adapted to engage in the attaching member for detachably securing it with the guard to maintain the attaching member in closed position.

3. A coupling device comprising a shank having a guard extending from one end therefrom, said guard formed with a tapered opening, at one end a hook-shaped attaching member pivotally connected at one end with said shank in proximity to the other end of the guard and having its other end tapered and adapted to extend in said opening, said tapered end formed with a peripheral groove, and a releasable locking device pivotally mounted on one side of said guard and engageable in said groove for detachably securing the attaching member in closed position.

4. A coupling device comprising a shank, a guard formed integral with one end of the shank and having its free end provided with a tapered opening, said guard further having one side thereof provided with a groove interesecting said opening, a hook-shaped attaching member having one end pivotally connected with the shank in proximity to the guard and its other end engageable in said opening and provided with a groove, and a releasable locking device pivotally mounted in the groove of the guard and detachably engaging in the groove of the attaching member for releasably securing said attaching member in closed position.

5. A coupling device comprising a shank provided with an opening at each end thereof, one of said openings providing means for coupling a towing element with the shank, a hook-shaped attaching member having one of its ends bifurcated and straddling said shank, means connected with the bifurcated end of said member and extending through the other of said openings for pivotally connecting said member to the shank, said member having its other end formed with a peripheral groove, a guard integral with that end of the shank with which the attaching member is pivotally connected, said guard provided with an opening for the reception of the grooved end of said attaching member, and spring controlled means pivotally mounted in one side of the guard and engageable in the grooved end of said attaching member for detachably securing said member in closed position.

6. A coupling device comprising a shank provided with an opening at each end thereof, one of said openings providing means for coupling a towing element with the shank, a hook-shaped attaching member having one of its ends bifurcated and straddling said shank, means connected with the bifurcated end of said member and extending through the other of said openings for pivotally connecting said member to the shank, said member having its other end formed with a peripheral groove, a guard integral with that end of the shank with which the attaching member is pivotally connected, said guard provided with an opening for the reception of the grooved end of said attaching member, and spring controlled means pivotally mounted in one side of the guard and engageable in the grooved end of said attaching member for detachably securing said member in closed position, the grooved end of said attaching member being tapered, and the opening in said guard being tapered.

In testimony whereof, I affix my signature hereto.

ALBERT C. BUBB.